United States Patent
Tessaro et al.

(10) Patent No.: US 12,145,668 B2
(45) Date of Patent: Nov. 19, 2024

(54) REDUNDANT STEERING SYSTEM

(71) Applicant: DANA ITALIA S.R.L., Trentino (IT)

(72) Inventors: Nicola Tessaro, Arco (IT); Davide Deimichei, Arco (IT); Efrem Rusconi, Arco (IT); Gianluca Terrasi, Arco (IT)

(73) Assignee: DANA ITALIA S.R.L., Trentino (IT)

( * ) Notice: Subject to any disclaimer, the term of this patent is extended or adjusted under 35 U.S.C. 154(b) by 329 days.

(21) Appl. No.: 17/647,429

(22) Filed: Jan. 7, 2022

(65) Prior Publication Data

US 2022/0219753 A1    Jul. 14, 2022

(30) Foreign Application Priority Data

Jan. 8, 2021  (DE) .................... 20 2021 100 068.6

(51) Int. Cl.
*B62D 5/12*  (2006.01)
*B62D 5/32*  (2006.01)

(52) U.S. Cl.
CPC  *B62D 5/32* (2013.01); *B62D 5/12* (2013.01)

(58) Field of Classification Search
CPC .................................. B62D 5/12; B62D 5/32
USPC ........................................................ 180/435
See application file for complete search history.

(56) References Cited

FOREIGN PATENT DOCUMENTS

WO    WO-2014096893 A1 *  6/2014  ............... B62D 5/04

* cited by examiner

*Primary Examiner* — Jacob D Knutson
*Assistant Examiner* — Felicia L. Brittman-Alabi
(74) *Attorney, Agent, or Firm* — McCoy Russell LLP

(57) ABSTRACT

The present disclosure relates to redundant steering system, including a first steering knuckle rotatable with respect to a first steering axis, a first steering cylinder, a first steering rod coupled to the first steering cylinder, a second steering cylinder, and a second steering rod coupled to the second steering cylinder. The first steering rod and the second steering rod are each rotatably coupled to the first steering knuckle at a distance from the first steering axis and at different positions along the first steering axis.

14 Claims, 3 Drawing Sheets

REDUNDANT STEERING SYSTEM

CROSS-REFERENCE TO RELATED APPLICATION

The present application claims priority to German Utility Model Application No. 20 2021 100 068.6, entitled "REDUNDANT STEERING SYSTEM", and filed on Jan. 8, 2021. The entire contents of the above-listed application is hereby incorporated by reference for all purposes.

TECHNICAL FIELD

The present disclosure relates to a redundant steering system, such as for use in motor vehicles.

BACKGROUND AND SUMMARY

According to Regulation No 79 of the Economic Commission for Europe of the United Nations (UN/ECE) (Uniform provisions concerning the approval of vehicles with regard to steering equipment [2018/1947]) a redundant steering system is provided in vehicles to ensure steering capability in case of the axle hydraulic and main steering system malfunctioning.

To provide such a fallback option in the event of degradation of the primary steering system, typically an external secondary device is installed in the steering axle. However, this can lead to compatibility problems and can result in high production and/or assembly costs.

Therefore, the objective technical problem of the present disclosure is to propose an improved or alternative steering system which provides redundancies and which may be easy to manufacture and/or assemble.

This objective technical problem is solved by a redundant steering system. Further embodiments may be deduced from the other features described in the detailed description.

The redundant steering system includes, in one example, a first steering knuckle rotatable with respect to a first steering axis, a first steering cylinder, a first steering rod coupled to the first steering cylinder, a second steering cylinder, a second steering rod coupled to the second steering cylinder, wherein the first steering rod and the second steering rod are each rotatably coupled to the first steering knuckle at a distance from the first steering axis and at different positions along the first steering axis.

The arrangement of the first steering rod and the second steering rod at a distance from the first steering axis may facilitate an assembly and/or may facilitate maintenance or replacement of defective parts.

The first steering rod may be coupled to the first steering knuckle at a first coupling position $x_1$ and the second steering rod may be coupled to the first steering knuckle at a second coupling position $x_2$. The first coupling position $x_1$ and the second coupling position $x_2$ may be disposed at the same distance from the first steering axis. The first coupling position $x_1$ and the second coupling position $x_2$ may be both disposed on a first coupling axis. The first coupling axis may be parallel to the first steering axis.

The length of the first and the second steering rod may be equal.

The distance between the first coupling position $x_1$ and the first steering axis may be a minimal distance. The distance may be measured along a straight line between the steering axis and a coupling axis, the line being perpendicular to the first steering axis and/or the first coupling axis.

The distance between the second coupling position $x_2$ and the first steering axis may be a minimal distance. The distance may be measured along a straight line between the steering axis and a coupling axis, the line being perpendicular to the first steering axis and/or the first coupling axis.

The redundant steering system may include a first lever portion fixedly connected to the first steering knuckle and a second lever portion fixedly connected to the first steering knuckle, wherein the first steering rod is coupled to the first steering knuckle via the first lever portion and wherein the second steering rod is coupled to the first steering knuckle via the second lever portion.

A first end portion of the first lever portion may be rotatably connected with the first steering rod and a second end portion of the first lever portion may be fixedly connected to the first steering knuckle. A first end portion of the second lever portion may be rotatably connected with the second steering rod and a second end portion of the second lever portion may be fixedly connected to the first steering knuckle. A distance between the first end portions of the first and the second lever portion along a direction parallel to the first steering axis may be larger than a distance between the second end portions of the first and the second lever portion along a direction parallel to the first steering axis.

A section of one of the lever portions extending between the end portions of said lever portion may extend perpendicular to the first steering axis.

The distance between the first coupling position $x_1$ and the first steering axis may be measured along the section of the first lever portion. The distance between the first coupling position $x_1$ and the first steering axis may be a minimal distance.

The distance between the second coupling position $x_2$ and the first steering axis may be measured along the section of the second lever portion. The distance between the second coupling position $x_2$ and the first steering axis may be a minimal distance.

The arrangement of the first steering rod and the second steering rod at a distance from the first steering axis may be advantageous to reduce a steering force to be provided by the steering cylinder.

The first steering rod may have an active area and the first steering cylinder may be configured to actuate the first steering rod via the active area of the first steering rod, wherein the second steering rod may have an active area and the second steering cylinder may be configured to actuate the second steering rod via the active area of the second steering rod, wherein the active area of the first steering rod and the active area of the second steering rod may be of equal size.

In one embodiment, at least one of the first steering rod and the second steering rod has an adjustable length. In one embodiment, the first steering cylinder and/or the second steering cylinder may be configured to be driven hydraulically. The first steering cylinder and the second steering cylinder may be configured to be controlled independently of one another. The steering system may include at least one hydraulic unit. The hydraulic unit for driving the first cylinder may also be used for the second cylinder. Alternatively, each cylinder can have its own hydraulic unit. The latter may have the advantage that in case of inoperability of one hydraulic unit, steering can be ensured by the other hydraulic unit.

In one embodiment, the steering system may further include a second steering knuckle rotatable with respect to a second steering axis (II), a third steering rod coupled to the first steering cylinder, wherein the third steering rod may be rotatably coupled to the second steering knuckle at a distance from the second steering axis. The third steering rod may be coupled to the second steering knuckle in a third coupling position $x_3$.

The design and/or arrangement of the third steering rod may be identical to the design and/or arrangement of the first steering rod, wherein the third steering rod is coupled to the second steering knuckle instead of the first steering knuckle.

The arrangement and/or design of the first steering rod and the first steering knuckle may be symmetrical to the arrangement and/or design of the third steering rod and/or the second steering knuckle.

The distance between the coupling position $x_3$ and the second steering axis may be equal to the distance between the coupling position $x_1$ and the first steering axis.

The minimal distance between the coupling point of the third steering rod to the second steering knuckle and the second steering axis may be measured along a longitudinal axis of the third lever portion.

In one embodiment, the first steering cylinder and the second steering cylinder may be arranged substantially parallel to each other.

In one embodiment, the first end portion of the first lever portion and the first end portion of the second lever portion are distanced from each other, for instance along the first coupling axis.

In one embodiment, the redundant steering may include a first flow generating unit such as a first hydraulic pump or a first hydraulic piston fluidly connected with the first steering cylinder for controlling the first steering cylinder, such as via a first valve unit, and a second flow generating unit such as a second hydraulic pump or a second hydraulic piston fluidly connected with the second steering cylinder for controlling the second steering cylinder, such as via a second valve unit.

In one embodiment, the steering system may include a steering wheel. The steering wheel may be coupled to the first flow generating unit and to the second flow generating unit.

While multiple embodiments of the presently proposed redundant steering system are disclosed, still other embodiments will become apparent to those skilled in the art from the following detailed description, which shows and describes illustrative embodiments. Accordingly, the drawings and the detailed description are to be regarded as illustrative in nature and not restrictive.

BRIEF DESCRIPTION OF THE FIGURES

FIG. 1 is drawn approximately to scale. However, other relative component dimensions may be used, in other examples.

DETAILED DESCRIPTION

Figure 1:
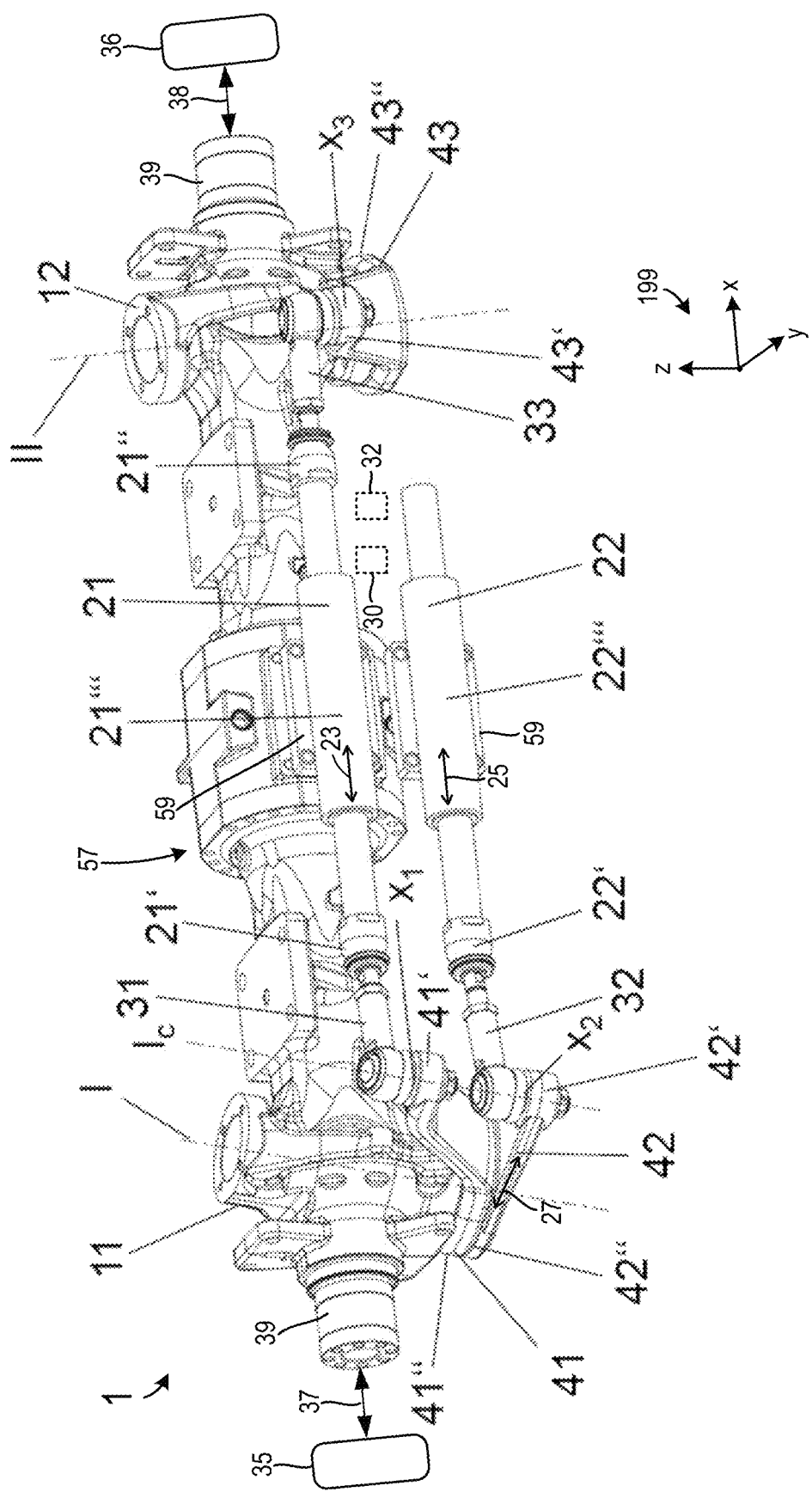
FIG. 1 shows a perspective view of a redundant steering system.

In FIG. 1, a redundant steering system 1 is illustrated. The redundant steering system 1 comprises a first steering knuckle 11 rotatable with respect to a first steering axis I. Further, the redundant steering system 1 comprises a first steering cylinder 21 and a first steering rod 31. Further, the redundant steering system comprises a second steering cylinder 22 and a second steering rod 32. Further, the redundant steering system comprises a second steering knuckle 12 and a third steering rod 33 rotatably coupled to the second steering knuckle 12. The first and second steering knuckles 11, 12 and/or other suitable system components may be coupled to steerable wheels 35, 36 which are schematically depicted in FIG. 1. Arrows 37, 38 denote the connection between the drive wheels 35, 36 and the knuckles 11, 12. It will be understood, that hubs 39 or other suitable components may enable the mechanical connection between the steerable wheels and the knuckles.

The first steering cylinder 21 has a first end 21' that is coupled to the first steering rod 31. The first end 21' of the first steering cylinder 21 is axially movable along a longitudinal axis 23 of the first steering cylinder 21 with respect to a main body 21''' of the first steering cylinder 21. When the first steering cylinder 21 is actuated, the first end 21' of the first steering cylinder 21 moves along the longitudinal axis 23 of the first steering cylinder 21, axially moving the first steering rod 31 to rotate the first steering knuckle 11.

Further, the first steering cylinder 21 and the second steering cylinder 22 may be coupled to an axle body 57 via mounting interfaces 59 (e.g., mounting plates). Further, the first steering cylinder 21 may be positioned above the second steering cylinder 22 with regard to the z-axis.

The first steering cylinder 21 has a second end 21'' that is coupled to the third steering rod 33. The second end 21'' of the first steering cylinder 21 is axially movable along a longitudinal axis 23 of the first steering cylinder 21 with respect to the main body 21''' of the first steering cylinder 21. When the first steering cylinder 21 is actuated, the second end 21'' of the first steering cylinder 21 moves along the longitudinal axis 23 of the first steering cylinder 21, axially moving the third steering rod 31 to rotate the second steering knuckle 12. When the first steering cylinder 21 is actuated, for instance the first end 21' and the second end 21'' of the first steering cylinder move along the longitudinal axis 23 of the first steering cylinder 21 in the same direction and by the same distance.

The second steering cylinder 22 has a first end 22' that is coupled to the second steering rod 32. The first end 22' of the second steering cylinder 22 is axially movable along a longitudinal axis 25 of the second steering cylinder 22 with respect to a main body 22''' of the second steering cylinder. When the second steering cylinder 22 is actuated, the first end 22' of the second steering cylinder 22 moves along the longitudinal axis 25 of the second steering cylinder 22, axially moving the second steering rod 32 to rotate the first steering knuckle 11.

The redundant steering system 1 may comprise a first lever portion 41 and a second lever portion 42. The first lever portion 41 has a first end portion 41' and a second end portion 41''. The first end portion 41' of the first lever portion 41 is rotatably coupled to the first steering rod 31 at a first coupling position $x_1$. The second lever portion 42 has a first end portion 42' and a second end portion 42''. The first end portion 42' of the second lever portion 42 is rotatably coupled to the second steering rod 32 at a second coupling position $x_2$.

The redundant steering system 1 may further comprise a third lever portion 43. The third lever portion 43 has a first end portion 43' and a second end portion 43''. The first end portion 43' of the third lever portion 43 is rotatably coupled to the third steering rod 33 in a third coupling position $x_3$.

The first end portion 41' of the first lever portion 41 and the first end portion 42' of the second lever portion 42 are distanced from each other. The second end portion 41'' of the first lever portion 41 and the second end portion 42" of the second lever portion 42 are, for instance directly, fixed to each other.

The second lever portion 42 has a second longitudinal axis 27 arranged substantially perpendicular to the first steering axis I.

The first steering cylinder 21 and the second steering cylinder 22 are arranged substantially parallel to each other.

The first coupling position $x_1$ and the second coupling position $x_2$ are disposed on a first coupling axis $I_C$ parallel to the first steering axis I. The second steering knuckle 12 defines a second steering axis II. The first steering knuckle 11 may be rotated around the first steering axis I. The second steering knuckle 12 may be rotated around the second steering axis II.

The first steering cylinder 21 and the second steering cylinder 22 may be substantially identical in design. The first steering cylinder 21 and the second steering cylinder 22 are driven hydraulically via a hydraulic actuation system 30. In another embodiment, the first or the second hydraulic cylinder 21, 22 may be driven mechanically via a mechanical actuation assembly 32.

Further, the first steering rod 31 and the second steering rod 32 may be substantially identical in design.

The first steering rod 31 and the second steering rod 32 are each rotatably coupled to the first steering knuckle 11 at a distance from the first steering axis I and at a different position $x_1$, $x_2$ along the first steering axis I. The third steering rod 33 is rotatably coupled to the second steering knuckle 12 at a distance from the second steering axis II.

A torque to turn the first steering knuckle 11 and the second steering knuckle 12 is composed of a force provided by the first steering cylinder 21 and a lever arm determined by the distance between the steering axis I and the pivot point $x_1$. In case of inoperability of the first steering cylinder 21, the torque may be provided by the second steering cylinder. This torque is composed by the force of the second steering cylinder 22 and a lever arm determined by the distance between the steering axis I and the pivot point $x_2$.

The redundant steering system may comprise a valve unit 5 hydraulically connected to the first steering cylinder 21 and the second steering cylinder 22. This steering system 70 is for example shown in FIG. 2. The steering system 70 is an example of the system 1, depicted in FIG. 1. Therefore, similar components are labelled accordingly. A control unit 6 is connected to the valve unit 5 and configured to control the valve unit. The control unit may comprise a flow generating unit 60, for example a hydraulic pump. A hydraulic line 61 may provide fluidic communication between the flow generating unit 60 and the valve unit 5. Further, hydraulic lines 62 may provide fluidic communication between the valve unit 5 and the first steering cylinder 21 and the second steering cylinder 22.

Figure 3:
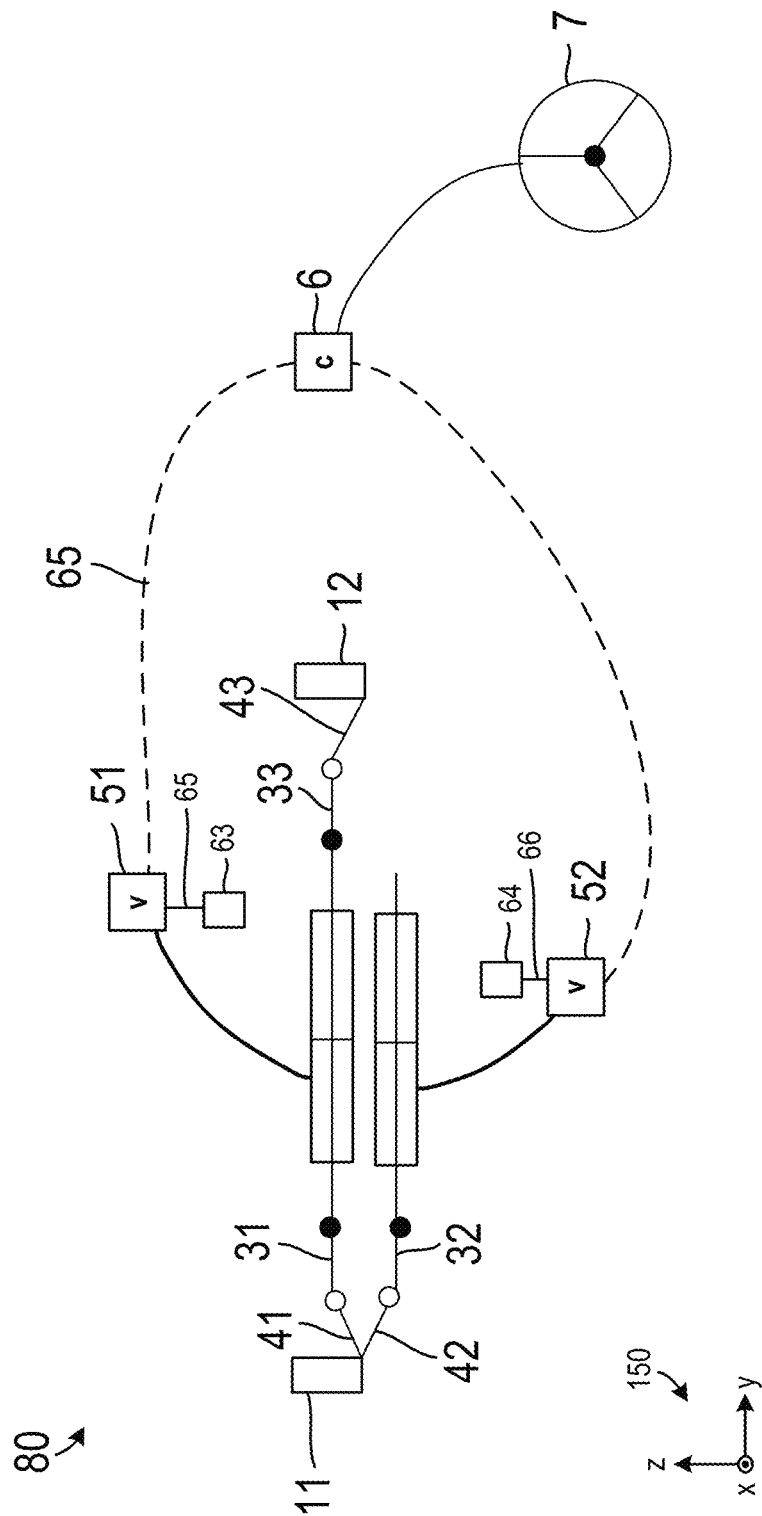
FIG. 3 shows a schematic view of a redundant steering system with two independent valve units.

In order to enable steering even in the event of degradation (e.g., inoperability) of valve unit 5, the redundant steering system may comprise a first valve unit 51 and a second valve unit 52, each connected to the control unit 6. The control unit 6 is configured to control the first valve unit 51 and the second valve unit 52 independently of each other. This configuration is shown in FIG. 3. As such FIG. 3 depicts another steering system 80. The steering system 80 is another example of the steering system 1, depicted in FIG. 1 and similar components are labelled accordingly.

Further, a steering wheel 7 may be provided. The control unit 6 is connected to the steering wheel 7 and the control unit 6 is configured to receive a steering angle or data indicative of a steering angle. The control unit 6 is further configured to control the first valve unit 51 and the second valve unit 52 based on the received steering angle to set a steering via the first steering cylinder, or—in case of degradation (e.g., inoperability) of the first steering cylinder 21 and/or a degradation (e.g., inoperability) of the first valve unit 51—via the second steering cylinder.

Further, as shown in FIG. 3, the redundant steering system 80 may include a first flow generating unit 63 that is in fluidic communication with the first control valve 51 and a second flow generating unit 64 that is in fluidic communication with the second control valve 52. The first and second flow generating units, shown in FIG. 3 as well as the other flow generating units described herein, may be hydraulic pumps and/or hydraulic pistons. Further, hydraulic lines 65, 66 may provide fluidic communication between the first flow generating unit 63 and the second flow generating unit 64 and the first control valve 51 and the second control valve 52.

Figure 2:
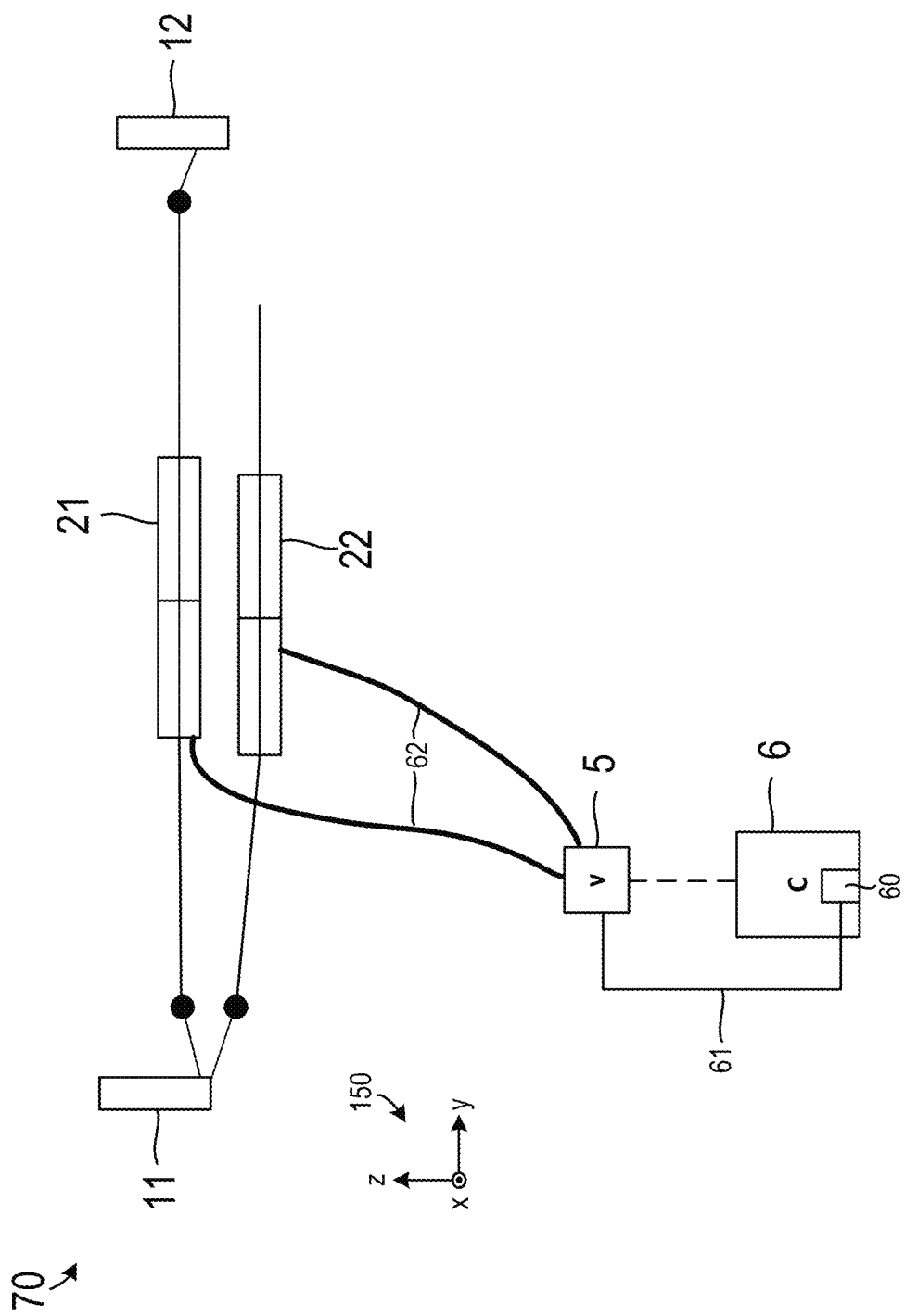
FIG. 2 shows a schematic view of the redundant steering system of FIG. 1.

An axis system 199 that include an x-axis, a y-axis, and a z-axis is provided in FIGS. 1-3 for reference. The z-axis may be parallel to a gravitational axis, the y-axis may be lengthwise axis, and the x-axis may be a lateral axis, although the axes may have other orientations, in other examples.

As used herein, the terms "approximately" and "substantially" are construed to mean plus or minus five percent of the range, unless otherwise specified.

The invention claimed is:

1. A redundant steering system, comprising:
   a first steering knuckle rotatable with respect to a first steering axis;
   a first steering cylinder;
   a first steering rod coupled to the first steering cylinder;
   a second steering cylinder; and
   a second steering rod coupled to the second steering cylinder;
   wherein the first steering rod and the second steering rod are each rotatably coupled to the first steering knuckle at a distance from the first steering axis and at different positions along the first steering axis.

2. The redundant steering system according to claim 1, wherein the first steering rod is coupled to the first steering knuckle at a first coupling position and the second steering rod is coupled to the first steering knuckle at a second coupling position, and wherein the first coupling position and the second coupling position are disposed at the same distance from the first steering axis.

3. The redundant steering system according to claim 1, wherein the first steering rod is coupled to the first steering knuckle at a first coupling position and the second steering rod is coupled to the first steering knuckle at a second coupling position, and wherein the first coupling position and the second coupling position are both disposed on a first coupling axis parallel to the first steering axis.

4. The redundant steering system according to claim 1, wherein the first steering rod has an active area and the first steering cylinder is configured to actuate the first steering rod via the active area of the first steering rod, wherein the second steering rod has an active area and the second steering cylinder is configured to actuate the second steering rod via the active area of the second steering rod, wherein the active area of the first steering rod and the active area of the second steering rod are of equal size.

5. The redundant steering system according to claim 1, wherein at least one of the first steering rod and the second steering rod has an adjustable length.

6. The redundant steering system according to claim 1, further comprising:
   a second steering knuckle rotatable with respect to a second steering axis, and
   a third steering rod coupled to the first steering cylinder, wherein the third steering rod is rotatably coupled to the second steering knuckle at a distance from the second steering axis.

7. The redundant steering system according to claim 1, wherein the first steering cylinder and the second steering cylinder are arranged substantially parallel to each other.

8. The redundant steering system according to claim 1, further comprising a first lever portion fixedly connected to the first steering knuckle and a second lever portion fixedly connected to the first steering knuckle, wherein the first steering rod is coupled to the first steering knuckle via the first lever portion and wherein the second steering rod is coupled to the first steering knuckle via the second lever portion.

9. The redundant steering system according to claim 8, wherein a first end portion of the first lever portion is rotatably connected with the first steering rod and a second end portion of the first lever portion is fixedly connected to the first steering knuckle, wherein a first end portion of the second lever portion is rotatably connected with the second steering rod and a second end portion of the second lever portion is fixedly connected to the first steering knuckle, wherein a distance between the first end portions of the first and the second lever portion along a direction parallel to the first steering axis is larger than a distance between the second end portions of the first and the second lever portion along a direction parallel to the first steering axis.

10. The redundant steering system according to claim 9, wherein a section of one of the first and second lever portions extending between the ends of said lever portion extends perpendicular to the first steering axis.

11. The redundant steering system according to claim 1, wherein the first steering cylinder and/or the second steering cylinder are configured to be driven hydraulically.

12. The redundant steering system according to claim 11, wherein the first steering cylinder and the second steering cylinder are configured to be controlled independently of one another.

13. The redundant steering system according to claim 11, further comprising a first flow generating unit fluidly connected with the first steering cylinder for controlling the first steering cylinder, via a first valve unit, and a second flow generating unit such fluidly connected with the second steering cylinder for controlling the second steering cylinder, such as via a second valve unit.

14. The redundant steering system according to claim 13, further comprising a steering wheel, wherein the steering wheel is coupled to the first flow generating unit and to the second flow generating unit.

* * * * *